(12) United States Patent
Chen et al.

(10) Patent No.: US 12,619,598 B2
(45) Date of Patent: May 5, 2026

(54) DATA ALLOCATION WITH USER INTERACTION IN A MACHINE LEARNING SYSTEM

(71) Applicant: INTERNATIONAL BUSINESS MACHINES CORPORATION, Armonk, NY (US)

(72) Inventors: Bei Chen, Blanchardstown (IE); Massimiliano Mattetti, Dublin (IE); Rahul Nair, Dublin (IE); Elizabeth Daly, Dublin (IE); Oznur Alkan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 17/453,330

(22) Filed: Nov. 2, 2021

(65) Prior Publication Data

US 2023/0136461 A1 May 4, 2023

(51) Int. Cl.
*G06F 16/23* (2019.01)

(52) U.S. Cl.
CPC ................................ *G06F 16/2379* (2019.01)

(58) Field of Classification Search
CPC ............................ G06F 16/2379; G06N 20/00
See application file for complete search history.

(56) References Cited

U.S. PATENT DOCUMENTS

| | | | |
|---|---|---|---|
| 8,359,223 B2 | 1/2013 | Chi et al. | |
| 10,572,819 B2 | 2/2020 | Klinger et al. | |
| 10,719,301 B1* | 7/2020 | Dasgupta .................. | G06F 8/34 |
| 2012/0030157 A1* | 2/2012 | Tsuchida ................ | G06N 20/00 706/20 |
| 2016/0132787 A1 | 5/2016 | Drevo et al. | |
| 2020/0272825 A1* | 8/2020 | Zhang .................... | G06N 3/045 |
| 2021/0117868 A1* | 4/2021 | Sriharsha ............... | G06N 20/20 |
| 2021/0256407 A1* | 8/2021 | Therani ................... | G06F 16/29 |
| 2021/0271934 A1* | 9/2021 | White ................... | G06N 3/045 |
| 2021/0374518 A1* | 12/2021 | Zhu .......................... | G06N 3/04 |
| 2023/0005023 A1* | 1/2023 | Zhang ............... | G06Q 30/0272 |

OTHER PUBLICATIONS

Meek, Christopher, Bo Thiesson, and David Heckerman. "The learning-curve sampling method applied to model-based clustering." Journal of Machine Learning Research 2.Feb. 2002: 397-418. (Year: 2002).*
Guan et al., "Cost-Sensitive Elimination of Mislabeled Training Data," in 402 Info. Sci. 170-81 (2017). (Year: 2017).*

(Continued)

*Primary Examiner* — Ryan C Vaughn
(74) *Attorney, Agent, or Firm* — Anthony Curro

(57) ABSTRACT

Various embodiments are provided for providing enhanced data allocation for machine learning operations in a computing environment by one or more processors in a computing system. One or more data sampling strategies may be determined based on a dataset. One or more enhanced training data allocations may be suggested for machine learning operations in a cloud computing environment based on the one or more data sampling strategies.

20 Claims, 9 Drawing Sheets

(56)           References Cited

OTHER PUBLICATIONS

Yadwadkar, Neeraja, "Machine Learning for Automatic Resource Management in the Datacenter and the Cloud", Dissertation, Electrical Engineering and Computer Sciences University of California at Berkeley, Aug. 2018 (pp. 125).

Zhang et al., "MArk: Exploiting Cloud Services for Cost-Effective, SLO-Aware Machine Learning Inference Serving", Proceedings of the 2019 USENIX Annual Technical Conference, Jul. 2019 (pp. 15).

Meinardi et al., "How to Manage and Optimize Costs of Public Cloud IaaS and PaaS", Gartner Information Technology Research, Published Mar. 23, 2020, (pp. 50) https://www.gartner.com/en/documents/3982411/how-to-manage-and-optimize-costs-of-public-cloud-iaas-an.

Garcia et al., "A cloud-based framework for machine learning workloads and applications", IEEE access, 8, 18681-18692, vol. 4, 2016, (pp. 12).

Ranganathan, S., Haribara, Y., "Cinnamon AI saves 70% on ML model training costs with Amazon SageMaker Managed Spot Training", Retrieved from https://aws.amazon.com/blogs/machine-learning/cinnamon-ai-saves-70-on-ml-model-training-costs-with-amazon-sagemaker-managed-spot-training/, Jan. 2020, (pp. 8).

Apply machine type recommendations to VM instances, Retrieved from: https://cloud.google.com/compute/docs/instances/apply-machine-type-recommendations-for-instances, dated Apr. 9, 2025, 10 pages.

AWS Compute Optimizer FAQs, Retrieved from web https://aws.amazon.com/compute-optimizer/faqs/, dated Mar. 30, 2025, 10 pages.

Chaurasiya, BK., Optimizing costs for machine learning with Amazon SageMaker, Retrieved from: https://aws.amazon.com/tr/blogs/machine-learning/optimizing-costs-for-machine-learning-with-amazon-sagemaker/, Oct. 27, 2020 , 7 pages.

Cloud Recommendation Engine, Retrieved from web https://docs.device42.com/reports/cloud-recommendation-engine/, dated Mar. 30, 2025, 9 pages.

Han, et al., Efficient Service Recommendation System for Cloud Computing Market, Retrieved from: https://link.springer.com/chapter/10.1007%2F978-3-642-10549-4_14, Nov. 2009, vol. 63, pp. 117-118.

Hossain, et al., A Data Compression and Storage Optimization Framework for IoT Sensor Data in Cloud Storage, 21st International Conference of Computer and Information Technology (ICCIT), Dec. 21-23, 2018, 6 pages.

Kolhar, et al., Storage Allocation Scheme for Virtual Instances of Cloud Computing, Neural Computing and Applications,Jan. 5, 2016, vol. 28, pp. 1397-1404.

MLOps: Continuous Delivery and Automation Pipelines in Machine Learning, Retrieved from: https://cloud.google.com/solutions/machine-learning/best-practices-for-ml-performance-cost, Aug. 28, 2024, 19 pages.

What is Active Assist, Retrieved from: https://cloud.google.com/recommender/docs/whatis-activeassist, dated Mar. 30, 2025, 5 pages.

No Author, "IBM Cloud Object Storage: Pricing", IBM, Oct. 24, 2020, 9 Pages.

No Author, "Recommender", Google Cloud, Oct. 16, 2021, 7 Pages.

No Author, "VM Instance Sizing Recommender", Google Cloud, Dec. 5, 2020, 6 Pages.

Yashchin Emmanuel. "Discussion: A Review of Some Sampling and Aggregation Strategies for Basic Statistical Process Monitoring (I. M. Zwetsloot and W. H. Woodall)", Journal of Quality Technology, Jul. 12, 2019, 7 Pages.

* cited by examiner

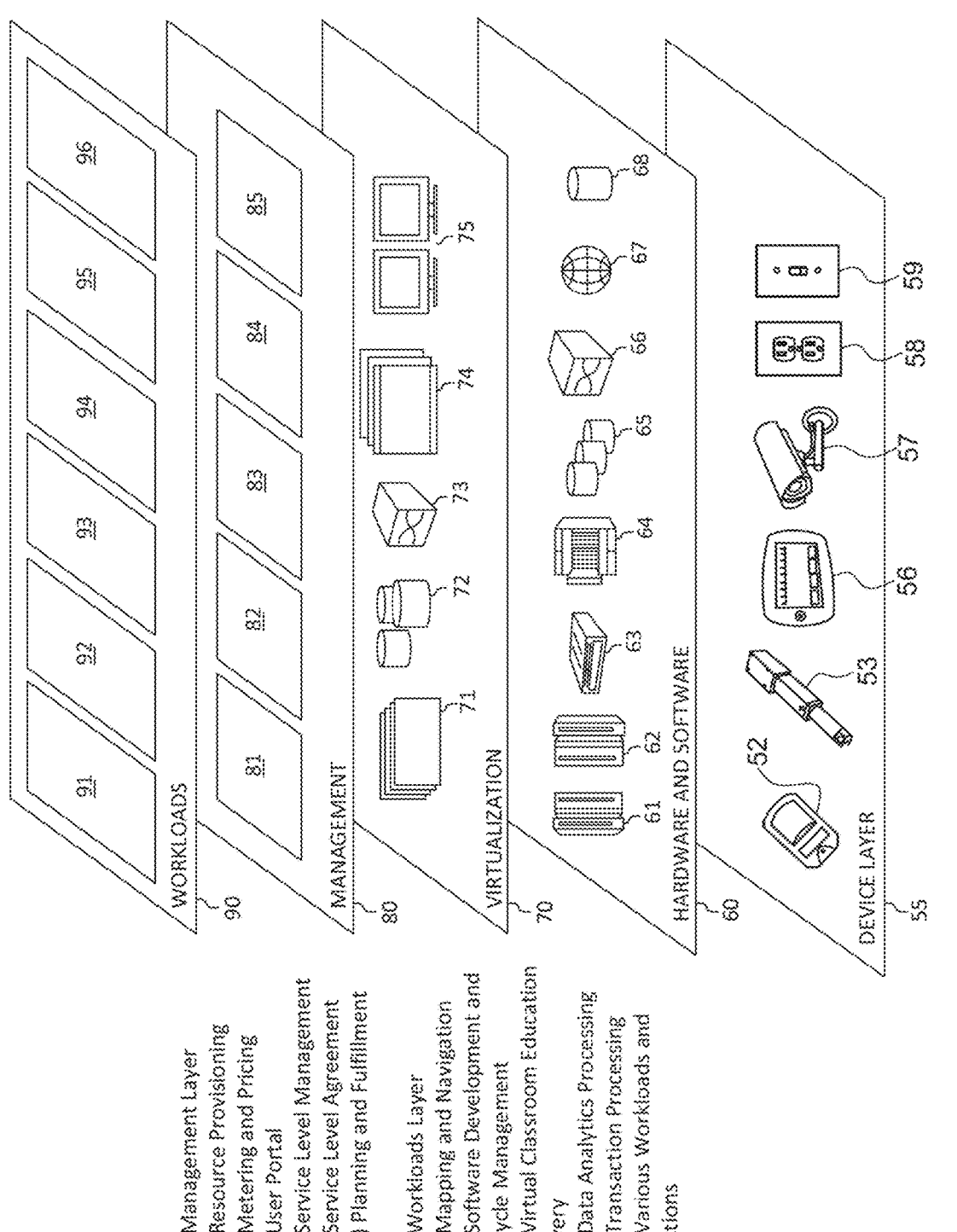

80 - Management Layer
81 - Resource Provisioning
82 - Metering and Pricing
83 - User Portal
84 - Service Level Management
85 - Service Level Agreement (SLA) Planning and Fulfillment 90 - Workloads Layer
91 - Mapping and Navigation
92 - Software Development and Lifecycle Management
93 - Virtual Classroom Education Delivery
94 - Data Analytics Processing
95 - Transaction Processing
96 - Various Workloads and Functions

FIG. 3

DATA ALLOCATION WITH USER INTERACTION IN A MACHINE LEARNING SYSTEM

BACKGROUND

The present invention relates in general to computing systems, and more particularly, to various embodiments for providing enhanced data allocation for machine learning operations in a computing environment in a cloud computing system using a computing processor.

SUMMARY

According to an embodiment of the present invention, a method for providing enhanced data allocation for machine learning operations in a computing environment in a computing system is provided. One or more data sampling strategies may be determined based on a dataset. One or more enhanced training data allocations may be suggested for machine learning operations in a cloud computing environment based on the one or more data sampling strategies.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

FIG. 3 is an additional block diagram depicting abstraction model layers according to an embodiment of the present invention.

DETAILED DESCRIPTION OF THE DRAWINGS

Figure 1:
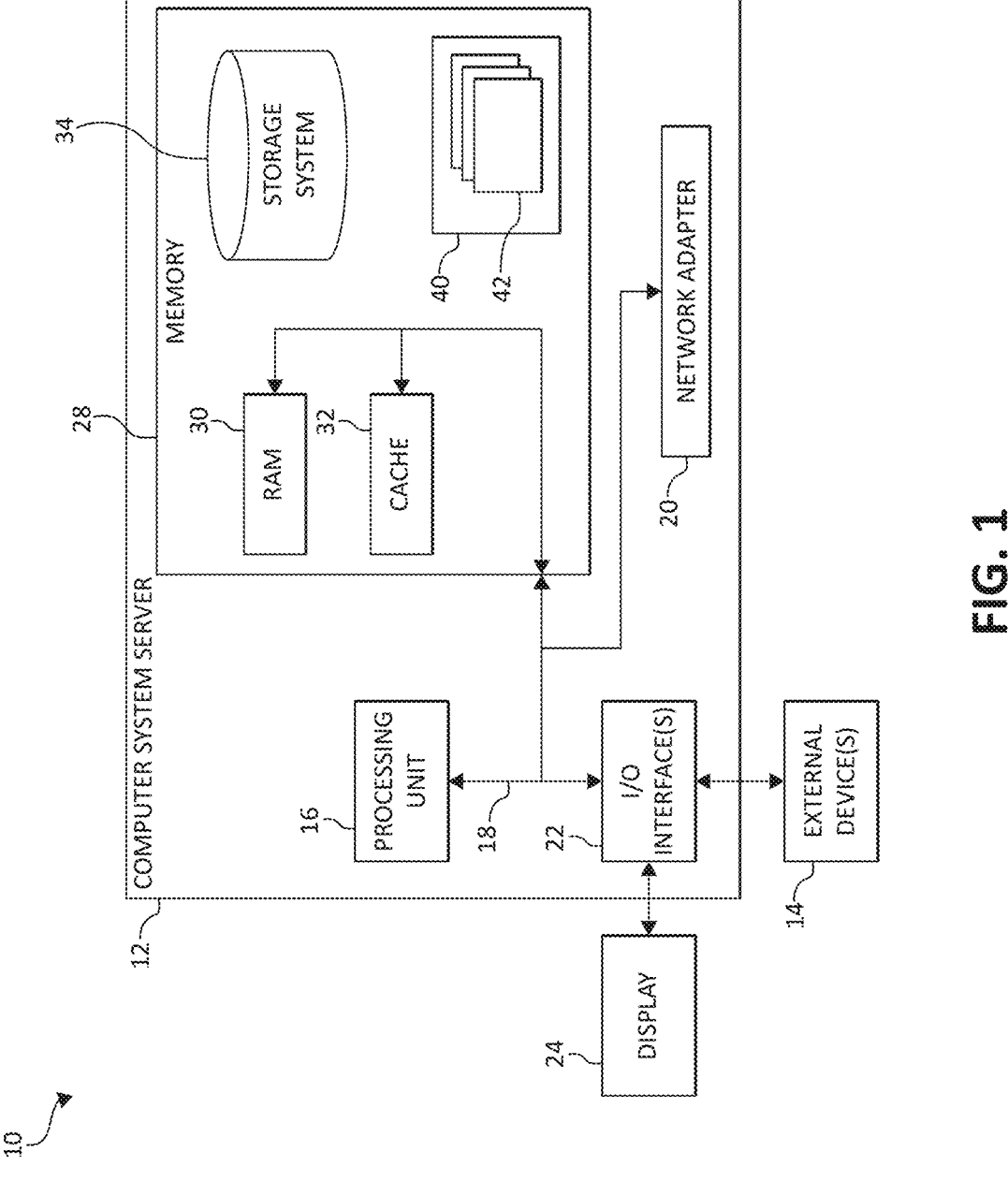
FIG. 1 is a block diagram depicting an exemplary cloud computing node according to an embodiment of the present invention.

The present invention relates generally to the field of artificial intelligence ("AI") such as, for example, machine learning and/or deep learning. Machine learning allows for an automated processing system (a "machine"), such as a computer system or specialized processing circuit, to develop generalizations about particular datasets and use the generalizations to solve associated problems by, for example, classifying new data. Once a machine learns generalizations from (or is trained using) known properties from the input or training data, it can apply the generalizations to future data to predict unknown properties.

Moreover, machine learning is a form of AI that enables a system to learn from data rather than through explicit programming. A major focus of machine learning research is to automatically learn to recognize complex patterns and make intelligent decisions based on data, and more efficiently train machine learning models and pipelines. However, machine learning is not a simple process. As the algorithms ingest training data, it is then possible to produce more precise models based on that data ("data" as used herein may be construed singularly or plurally). A machine-learning model is the output generated when a machine-learning algorithm is trained with data. After training, input is provided to the machine learning model which then generates an output. For example, a predictive algorithm may create a predictive model. Then, the predictive model is provided with data and a prediction is then generated (e.g., "output") based on the data that trained the model.

Machine learning enables machine learning models to train on datasets before being deployed. Some machine-learning models are online and continuous. This iterative process of online models leads to an improvement in the types of associations made between data elements. Different conventional techniques exist to create machine learning models and neural network models. The basic prerequisites across existing approaches include having a dataset, as well as basic knowledge of machine learning model synthesis, neural network architecture synthesis and coding skills.

In addition, as used, herein, cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

Thus, a current challenge for large data stores using a cloud computing service is the overall cost to do so. Additionally, retrieving and training machine learning models using the cloud computing service is also time consuming. Other challenges arise for machine learning models using the cloud computing service such as whether all of the available data is required to achieve a desired accuracy, whether the true data is always better or more optimal, and whether or not the addition cost relating to use of the cloud computing system and time constraints outweigh the cost to achieve a most recent, minor machine learning accuracy improvement.

For example, typically there are two parts of the cost for an automated machine learning prediction service hosted on a cloud computing system such as, for example, a system that is a unified platform that delivers a data fabric to connect and access siloed data on premises or across multiple clouds without moving it.

In some implementations, part 1 may be the data storage in cloud object store, and part 2 may be the training and online scoring being charged according to T-shirt size: e.g., 4 core 16 gigabyte ("GB") or 8 Core 32 GB. As used herein, "t-shirt" size or "sizing" may refer to a bundle of fixed amount of RAM and storage with a given number of virtual CPU cores. Thus, if more resources are required such as, for example, RAM, a large sized workload instance must be consumed. That is, additional CPU cores may not be required or even additional storage, but the additionally required RAM must be purchased. Thus, when IT resources are obtained as-a-service from a cloud computing system, then fees must be charged for the resources. The t-shirt model offers a fixed set of static configurations/sizes for virtual machines ("VMs"), where the user may be charged on a per-VM/hour ("hr") basis with greater charges for VMs with more resources.

Accordingly, the various embodiments of the present invention provide for an additional step in the data preprocessing with an enhanced data selection operation. In one aspect, input data may be received such as, for example, relevant training data, meta information (e.g., seasonality, significant change point, etc.), etc. A learning curve projection operation is executed to predict and inform a user the xth amount of the additional cost and expense along with the nth amount of additional time to achieve a Zth % accuracy improvement, where x, n, and Z are positive integers or set values.

A determination operation may be executed to determine the correct, accurate, or most appropriate data selection criteria (e.g., via a user and/or machine learning operation) to select the data size. Also, additional insights may be identified and/or received for the detected anomaly, data shifts, etc. such as, for example, a user and/or machine learning operation may provide the detected anomaly, data shifts, etc.

Additionally, the present invention enables and provides for a joint optimization of time series data pipelines. which consider temporally dependent structures of the data, such as, for example, 1) the order of the sequential data cannot be randomized, and 2) data from far past become less relevant.

In other implementations, the present invention provides for enhanced data allocation for machine learning operations in a computing environment. One or more data sampling strategies may be determined based on a dataset. One or more enhanced training data allocations may be suggested for machine learning operations in a cloud computing environment based on the one or more data sampling strategies.

Thus, prior to a user or clients purchasing the service, the present invention provides for a data allocation operation to produce expected accuracy and run time for different T-shirt sizes at fine grid (e.g., for 1 more additional core, determining how much additional accuracy one can achieve). Additionally, the present invention may suggest which portion of data to remove to minimize the cost under the constraint on expected accuracy and run time. The client is then enabled by the present invention prior data being uploaded to the cloud computing system. Alternatively, the present invention can be offered as a part of a data pre-processing step of the automated machine learning model prediction service, i.e., before the automated machine learning operation starts.

Additionally, the present invention may be provided and deployed prior to a user uploading data to a cloud computing system. For example, in one implementation, the present invention may be employed as part of the data preprocessing step of an automated machine learning prediction service, i.e., before the actual automated machine learning starts. In this way, the historical data show on average approximately 10% saving can occur for the initial data storage stage and up to 50% saving can occur in a machine learning model maintenance stage.

As used herein, by way of example only, a "machine learning model" may be a system that takes as input the curated and preprocessed data and will output a prediction (e.g., the output of all steps that happened before in the machine learning pipeline), depending on the task, and the prediction may be a forecast, a class, and/or a more complex output such as, for example, sentences in case of translation. In another aspect, a machine-learning model is the output generated upon training a machine-learning algorithm with data. After training, the machine learning model may be provided with an input and the machine learning model will provide an output.

In general, as used herein, "optimize" (e.g., or "best") may refer to and/or be defined as "maximize," "minimize," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation to be performed in order to achieve an improved result such as reduced execution costs or increased resource utilization (whether or not the optimum result is actually achieved). Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.
Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media "media" as used herein may be construed singularly or plurally). Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
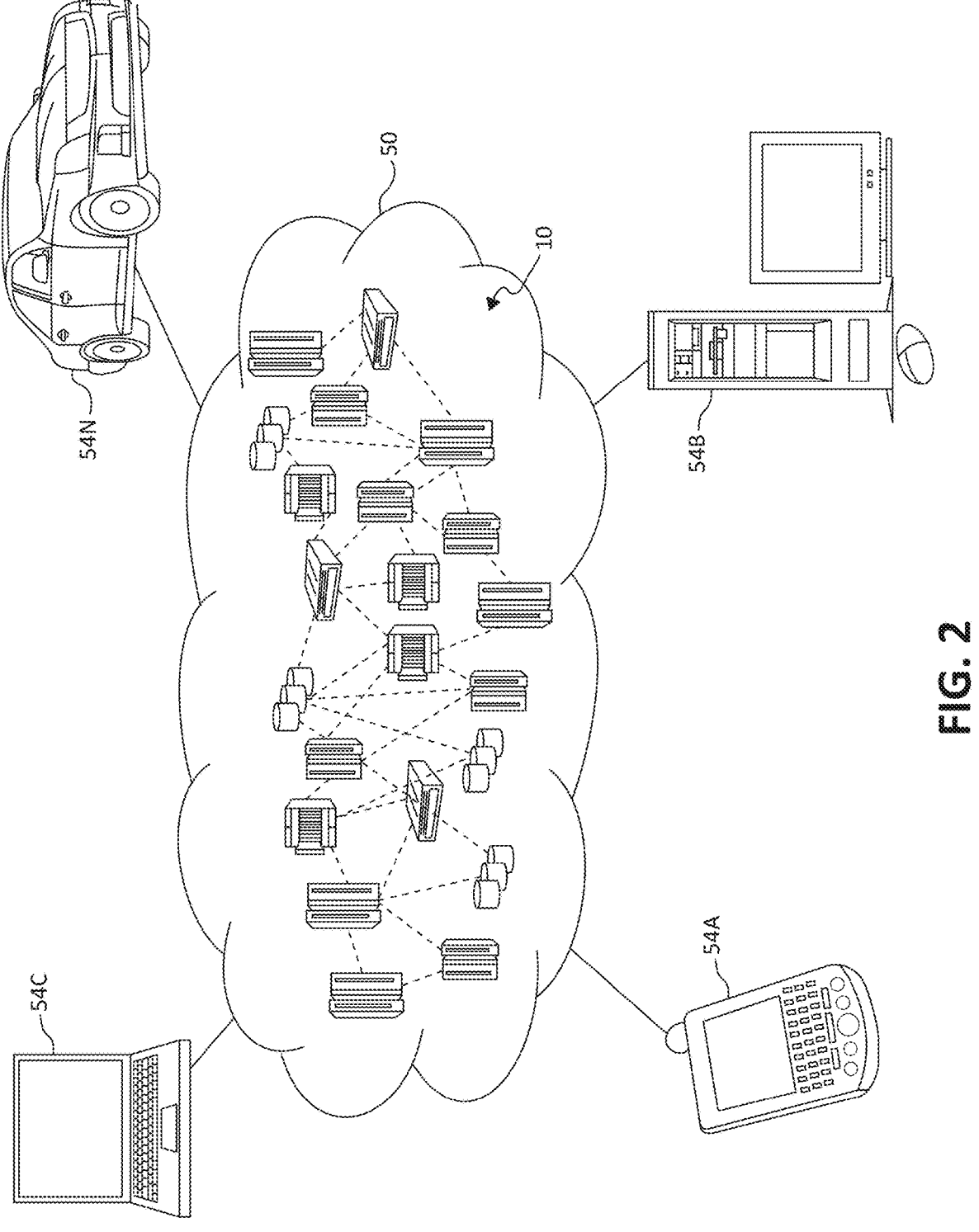
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote-control device), additional actuator devices, so-called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing enhanced data allocation for machine learning operations in a computing environment in a cloud computing system. In addition, workloads and functions 96 for providing enhanced data allocation for machine learning operations in a computing environment in a cloud computing system may include such operations as analytics, deep learning, and as will be further described, user and device management functions. One of ordinary skill in the art will appreciate that the workloads and functions 96 for providing enhanced data allocation for machine learning operations in a computing environment in a cloud computing system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing enhanced data allocation for machine learning operations in a computing environment in a computing system. One or more data sampling strategies may be determined based on a dataset. One or more enhanced training data allocations may be suggested for machine learning operations in a cloud computing environment based on the one or more data sampling strategies.

Figure 4:
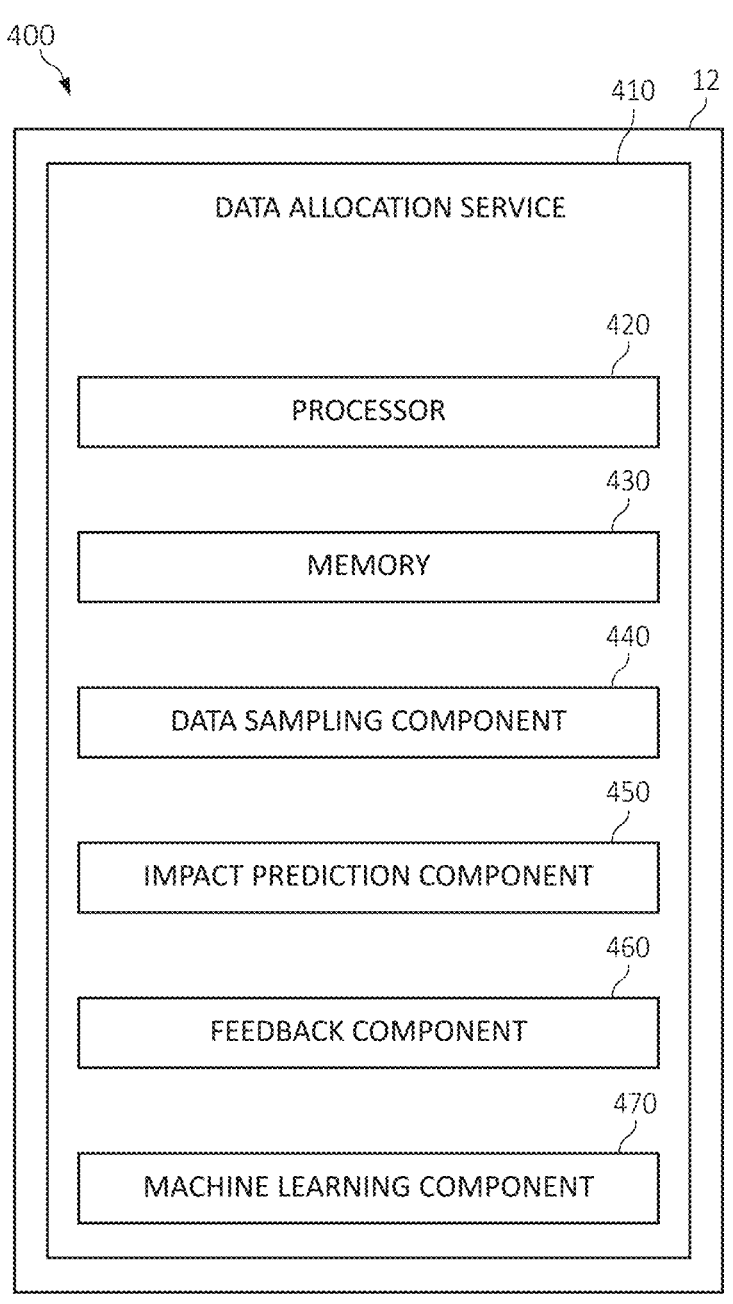
FIG. 4 is an additional block diagram depicting an exemplary functional relationship between various aspects of the present invention.

Turning now to FIG. 4, a block diagram depicting exemplary functional components of system 400 for providing enhanced data allocation for machine learning operations in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A data allocation service 410 is shown, incorporating processing unit 420 ("processor") to perform various computational, data processing and other functionality in accordance with various aspects of the present invention. In one aspect, the processor 420 and memory 430 may be internal and/or external to the data allocation service 410, and internal and/or external to the computing system/server 12. The data allocation service 410 may be included and/or external to the computer system/server 12, as described in FIG. 1. The processing unit 420 may be in communication with the memory 430. The data allocation service 410 may include a data sampling component 440, an impact prediction component 450, a feedback component 460, and a machine learning component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the data allocation service 410 may receive, identify, and/or select a machine learning model and/or machine learning pipeline, a dataset for a data set (e.g., a time series data set) used for testing the machine learning model and/or machine learning pipeline.

In some implementations, the data sampling component 440, the impact prediction component 450, the feedback component 460, and the machine learning component 470 may determine one or more data sampling strategies based on a dataset and suggest one or more enhanced training data allocations for machine learning operations in a cloud computing environment based on the one or more data sampling strategies.

In some implementations, the data sampling component 440 may receive, as the dataset, a plurality of data types and data features, where the plurality of data types include at least tabular data and timeseries data and the data features include at least a change point, seasonality data, and clustered data.

In some implementations, the data sampling component 440, the impact prediction component 450, the feedback component 460, and the machine learning component 470 may apply a forward allocation as a data sampling strategy for tabular data; apply a backward allocation as a data sampling strategy for time series data; apply a stratified sampling as a data sampling strategy for clustered data; apply constraint sampling to include a defined time period as a data sampling strategy for seasonal data; and use a change point detection as a data sampling strategy for abnormal data.

The feedback component 460 may collect feedback data based on the one or more data sampling strategies.

In some implementations, the data sampling component 440, the impact prediction component 450, the feedback component 460, and the machine learning component 470 may provide one or more t-shirt size options, data storage options, and the one or more data sampling strategies for suggesting one or more enhanced training data allocations.

The impact prediction component 450 may provide a projected learning curve for the machine learning operations and benefit tradeoffs for each of the one or more enhanced training data allocations. The impact prediction component 450 may predict a degree of impact on the dataset for each of the one or more enhanced training data allocations based on a training accuracy, training time, the dataset, computing hardware configurations, and the one or more data sampling strategies.

In one aspect, the machine learning component 470 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, Naïve Bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, Fisher's Linear Discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, Apriori algorithm, ECLAT algorithm, FP-growth algorithm, hierarchical clustering, single-linkage clustering, conceptual clustering, partitional clustering, k-means algorithm, fuzzy clustering, and reinforcement learning. Some non-limiting example examples of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
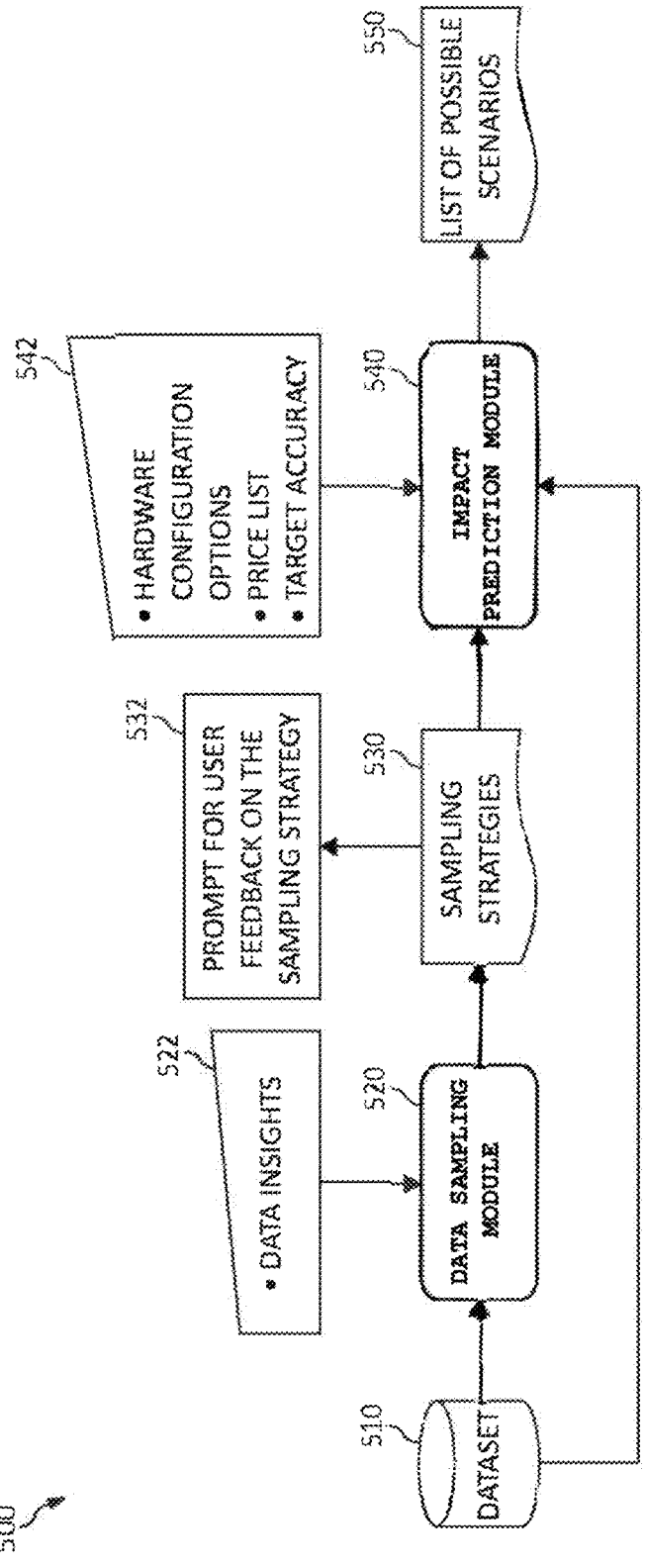
FIG. 5 is block diagram depicting an exemplary operations for providing enhanced data allocation for machine learning operations in which aspects of the present invention may be realized.

Turning now to FIG. 5, a block diagram depicts a system 500 in a computing environment for providing enhanced data allocation for machine learning operations in a cloud computing system. In one aspect, one or more of the components, modules, services, applications, and/or functions described in FIGS. 1-4 may be used in FIG. 5. As shown, various blocks of functionality are depicted with arrows designating the blocks of system 500 relationships with each other and to show process flow (e.g., steps or operations). Additionally, descriptive information is also seen relating each of the functional blocks of system 500. As will be seen, many of the functional blocks may also be considered "modules" of functionality, in the same descriptive sense as has been previously described in FIGS. 1-4. With the foregoing in mind, the module blocks of system 500 may also be incorporated into various hardware and software components of a system for automated evaluation of machine learning models in a computing environment in accordance with the present invention. Many of the functional blocks of system 500 may execute as background processes on various components, either in distributed computing components, or elsewhere.

Starting in block 510, a dataset 510 may be received by a data sampling module 520. That is, a user may send or point to the dataset 510 (for data selection). The data sampling module 520 may receive the dataset 510, which may include a variety of data types), metadata, data insights (e.g. seasonal data), a selection of annotated portions of interest in the data, etc. The data sampling module 520 analyses the dataset 510 to determine relevant data sampling strategy The data sampling strategies 530 may be sent back to the user with a "prompt" for the user to provide feedback on the data sampling strategies 530, as in block 532. The feedback may be collected and received via a user interface ("UI") (e.g., display 24 and/or Input/Output (I/O) interfaces 22 of FIG. 1), which UI may collect, send, and/or receive user choices, selections, insights, and/or feedback data.

In some implementations, the data sampling strategies 530 may include, by way of example, only, 1) assembling the data samples into tables, 2) summarizing the data sampling strategy in natural language and output to the user, and 3) requesting a user to optionally provide feedback, or other operations. The data sampling module 520 may be triggered, based on the feedback data, from block 532), to re-execute and determine alternative relevant data sampling strategies 530, or proceed to the next step and invoke the impact prediction module 540.

The impact prediction module 540 may receive the data sampling strategies 530, based on the feedback collected in block 532. Also, the impact prediction module 540 may receive as input data 542. The input data and the data sampling strategies 530 may include target accuracy, the dataset 510 (from block 510), dataset features, data sampling strategies 530, available hardware configuration options and price list.

That is, the impact prediction module 540 may predict and determine a cost (e.g., a financial cost) of each data sampling strategies 530 with highlights on a cost of plateau. The impact prediction module 540 may also determine/compute a marginal gain in terms of accuracy after a plateau and its additional cost.

The impact prediction module 540 may generate a list of possible scenarios 550 (e.g., a list of possible options for "t-shirt" sizes and data storage options) along with one or more of the data sampling strategies 530, based on the feedback collected in block 532.

That is, the impact prediction module 540 may generate a prediction of the impact of accuracy, training time, data storage, and cost for each available t-shirt size. The impact prediction module 540 may execute one or more hypothetical operations (e.g., a "what if" analysis) to assume a user intends to reduce a data storage size and training time. The impact prediction module 540 may also provide a predicted impact base one or metrics (e.g., the input data 542 and the data sampling strategies 530) for cost-saving data allocations in a cloud computing environment.

The list of possible scenarios 550 may include a list of one or more of the data sampling strategies 530 and/or data reduction strategies to be explored (e.g., split data sequentially, sample randomly, any available data compression techniques).

For example, the list of possible scenarios 550 may include 1) a brute force operation, 2) a heuristic search, and 3) a surrogate model (e.g., querying a data repository of past machine learning/data pipelines to retrieve, identify, and/or learn a tradeoff between performance and sampling strategies). The list of possible scenarios 550 may provide and depict to a user one or more data sampling strategies 530 scenarios with extreme maximum/minimum of each parameter and a proposed trade off. A user is then enabled by the impact prediction module 540 to explore and filter the collection of scenarios with tradeoffs (e.g., via an interactive user interface displaying the list of possible scenarios 550).

Figure 6A:
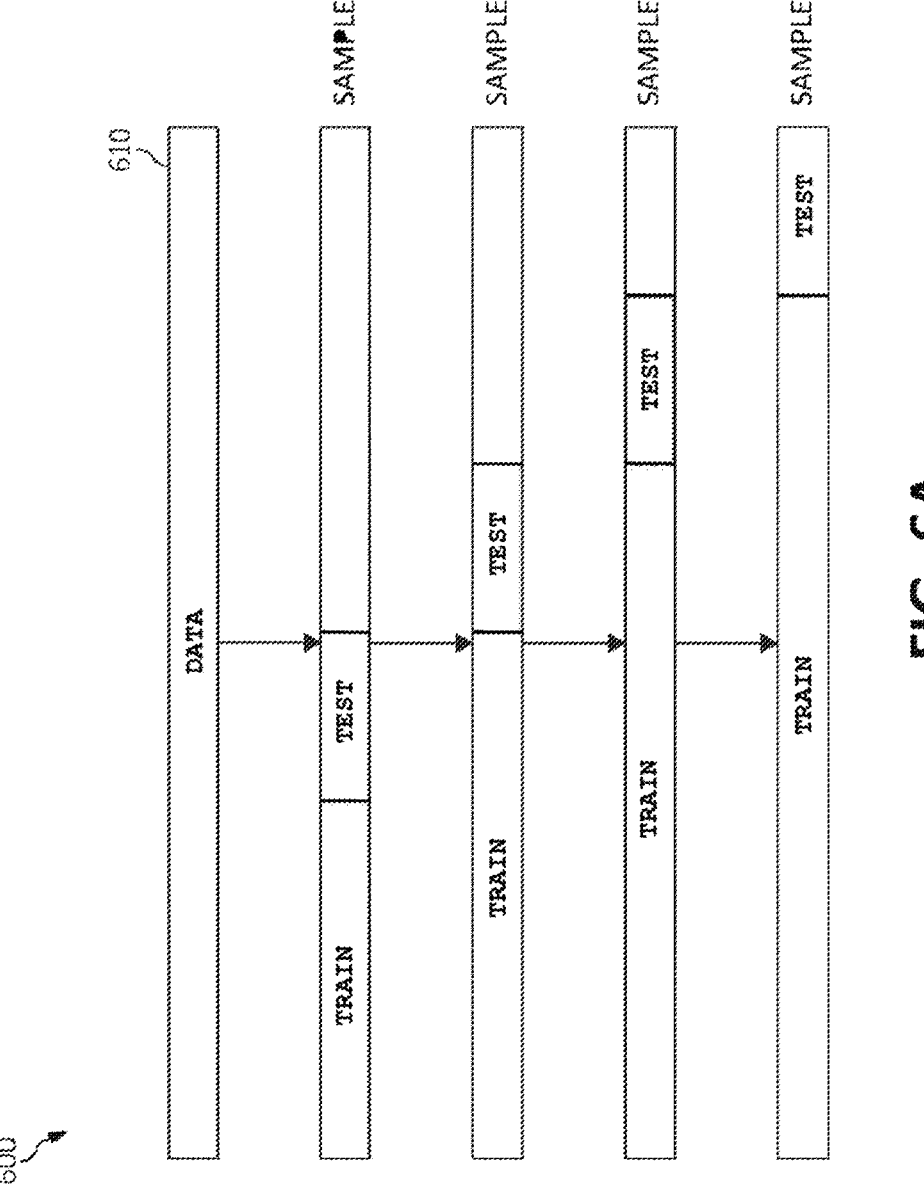
FIGS. 6A-6B are block diagrams depicting exemplary operations for providing enhanced data allocation for machine learning operations in different data sampling modules in which aspects of the present invention may be realized.
Figure 6B:
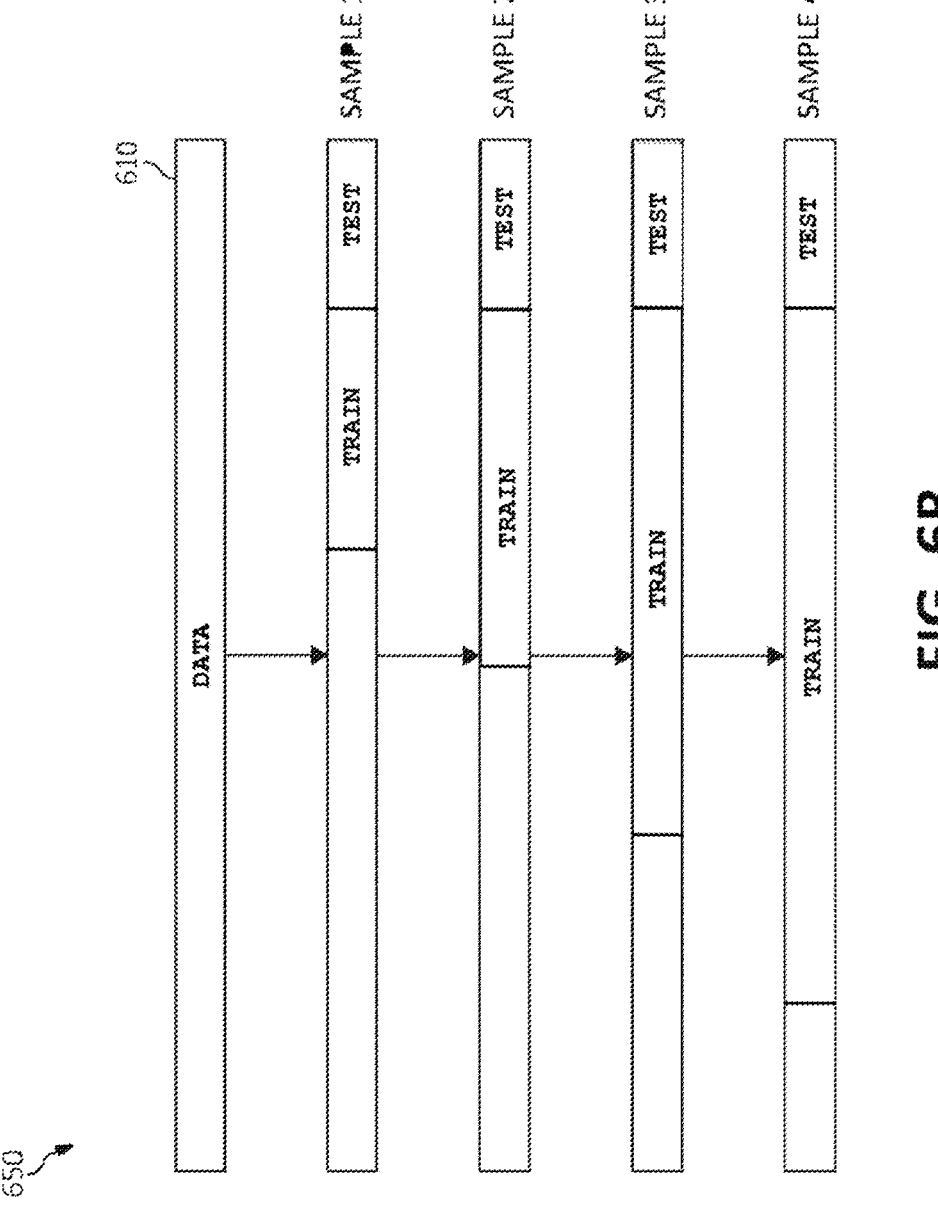

For further explanation, FIGS. 6A-6B are block diagrams 600 and 650 depicting exemplary operations for providing enhanced data allocation for machine learning operations in different data sampling modules in which aspects of the present invention may be realized.

In FIG. 6A, block diagram 600 depicts data 610 as user input data for a first data sampling module (e.g., a first type of data sampling module 520 of FIG. 5). The data 610 may include a data type (e.g., tabular data, time series data, and/or image/text data). The data 610 may also include one or more data features (e.g., seasonality data, change point data, data clusters, etc.).

Based on the user input for the data 610, the first data sampling module of data sampling module 520 of FIG. 5 may determine an operation for extracting and allocating data samples from the data 610 (e.g., dataset(s)). For example, if data 610 is tabular data, a forward data allocation operation may be applied, as depicted in sample 1, sample 2, sample 3, and sample 4, where each sample depicts a different amount of training data and testing data.

Alternatively, as depicted in FIG. 6B, a second data sampling module (another type of data sampling module 520 of FIG. 5) may determine an operation for extracting and allocating data samples from the data 610 (e.g., dataset(s)). For example, if data 610 is time series data, a backward data allocation operation may be applied, as depicted in sample 1, sample 2, sample 3, and sample 4, where each sample depicts a different amount of training data and testing data. In some implementations, if data clusters are identified, stratified sampling operations may be provided/used. Alternatively, if seasonality is identified, constraint samples may be included for at least one entire season.

It should be noted that a variety of data sampling modules or operations of the data sampling module may be used. For example, another type of operation or data sampling module may be used for when abnormal data occurs in a most recent portion, i.e., the most recent portion is not selected. That is, a change point detection operation will be triggered and used. For example, the data from a year that experiences a global pandemic is likely different from a non-global pandemic year. A change point detection operation can decide whether there are one or multiple regime changes. If yes, change point detection operation can determine whether an abnormal portion of data can be re-used after some data manipulations or adjustments (e.g., shift by a mean value, scale up or down by the sample variance, etc.).

Figure 7:
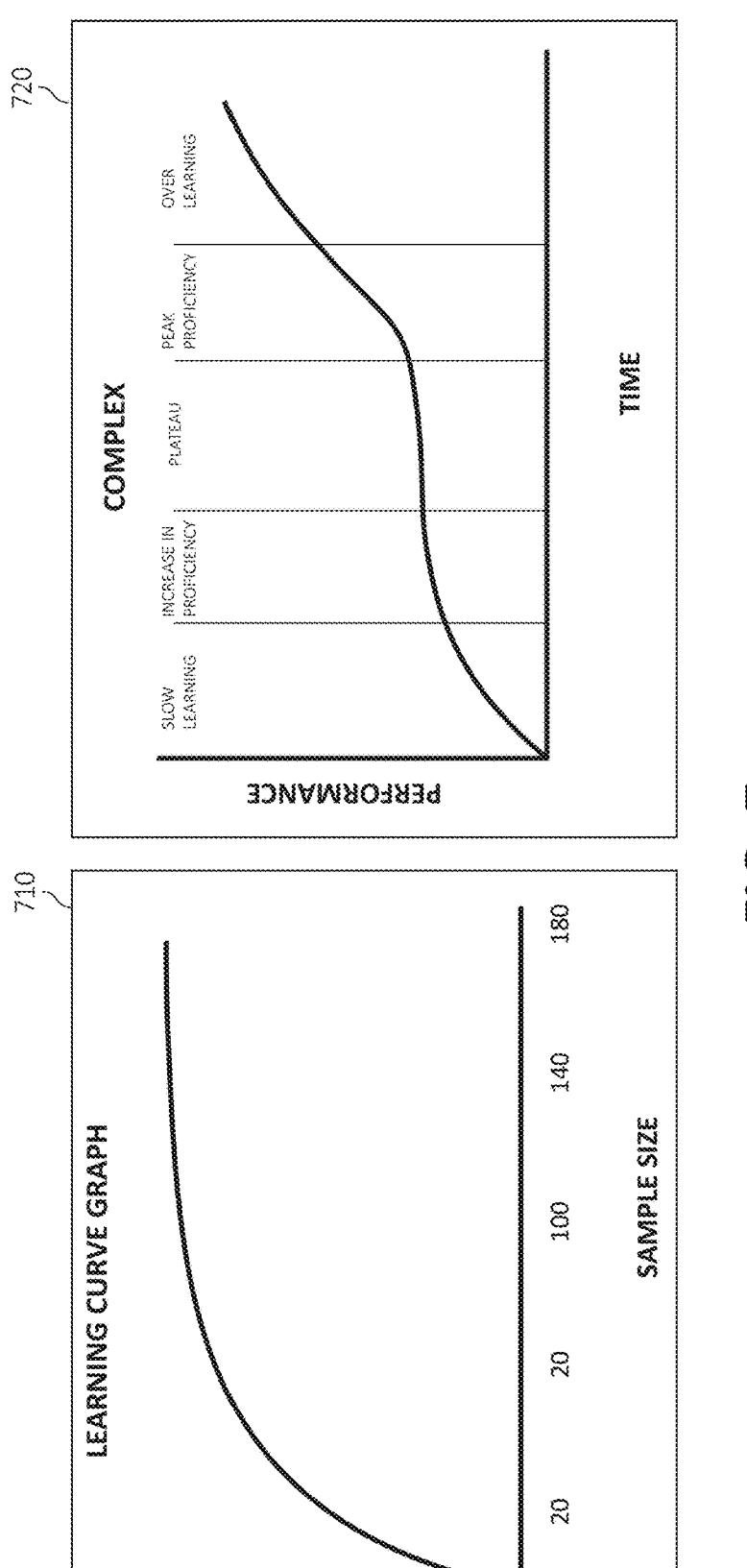
FIG. 7 is graph diagram depicting an exemplary operation for various results of an impact prediction component in which aspects of the present invention may be realized.

For further explanation, FIG. 7 is graph diagram depicting exemplary operations for various results of an impact prediction component in which aspects of the present invention may be realized. For example, a learning curve graph 710 and a complex graph 720 are depicted showing performance on the y-axis and sample size on the x-axis for the learning curve graph 710 and time on the x-axis for the complex graph 720.

Based on the set of data sampling strategies 530 from the data sampling modules (e.g., the data sampling modules 520), the impact prediction module 540 fits the machine learning algorithm, either by default or from user input, to generate a projected learning curve using a data allocation strategy, referred to herein as a data allocation using upper bounds (DAUB) operation (e.g., an automated intelligent data navigation and prediction tool). In one aspect, the DAUB operation follows the principle of optimism under uncertainty. That is, under mild assumptions of diminishing returns of allocating more training data, the DAUB algorithm achieves sub-linear regret in terms of misallocated data, which extends to sub-linear regret in terms of the training cost when the training cost functions are not too dissimilar. Further, the DAUB operation obtains, without further assumptions on accuracy functions, a bound on misallocated data that is asymptotically tight.

In other words, the impact prediction module 540 may provide for an automated intelligent data navigation and prediction tool which provides for automatically selecting from a plurality of analytic algorithms a best performing analytic algorithm to apply to a dataset. The automatically selecting from the plurality of analytic algorithms the best performing analytic algorithm to apply to the dataset enables training a plurality of analytic algorithms on a plurality of subsets of the dataset. Then, a corresponding prediction accuracy trend is estimated across the subsets for each of the plurality of analytic algorithms to produce a plurality of accuracy trends. Next, the best performing analytic algorithm is selected and outputted from the plurality of analytic algorithms based on the corresponding prediction accuracy trend with a highest value from the plurality of accuracy trends.

Figure 8:
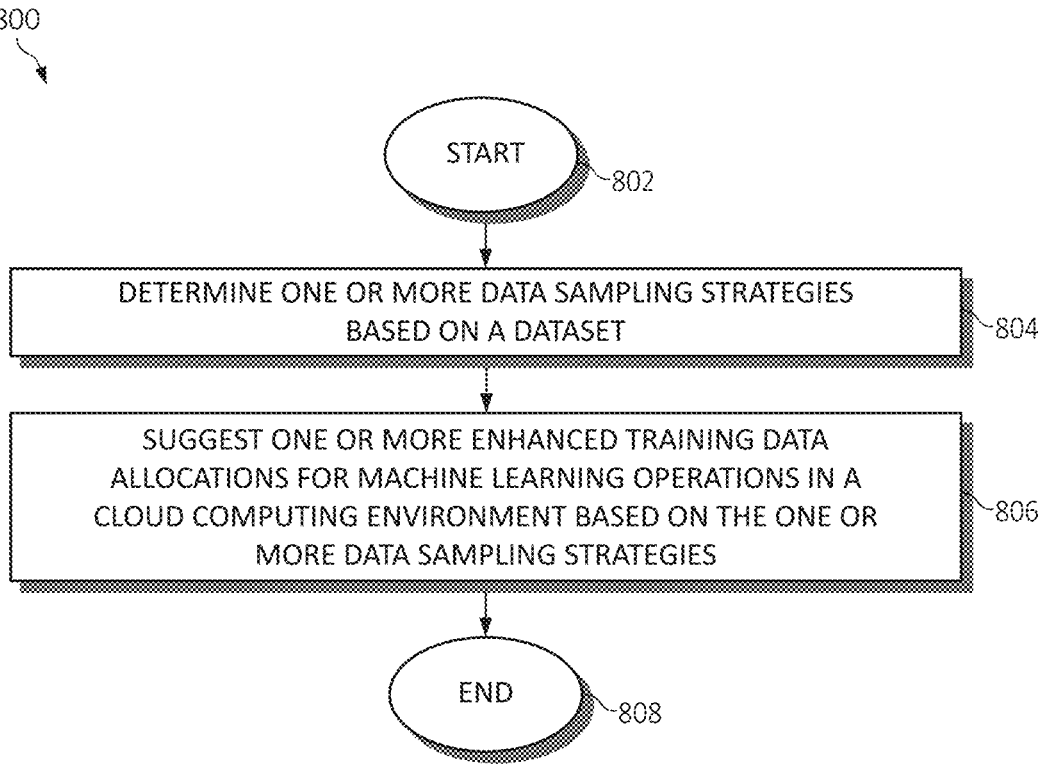
FIG. 8 is a flowchart diagram depicting an exemplary method for providing enhanced data allocation for machine learning operations in different data sampling modules in a computing environment by a processor, again in which aspects of the present invention may be realized.

Turning now to FIG. 8, a method 800 for providing enhanced data allocation for machine learning operations in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

One or more data sampling strategies may be determined based on a dataset, as in block 804. One or more enhanced training data allocations may be suggested for machine learning operations in a cloud computing environment based on the one or more data sampling strategies, as in block 806. The functionality 800 may end, as in block 808.

In one aspect, in conjunction with and/or as part of at least one block of FIG. 8, the operations of method 800 may include each of the following. The operations of 800 may receive, as the dataset, a plurality of data types and data features, wherein the plurality of data types include at least tabular data and timeseries data and the data features include at least a change point, seasonality data, and clustered data. The operations of 800 may apply a forward allocation as a data sampling strategy for tabular data; apply a backward allocation as a data sampling strategy for time series data; apply a stratified sampling as a data sampling strategy for clustered data; apply constraint sampling to include a defined time period as a data sampling strategy for seasonal data; and use a change point detection as a data sampling strategy for abnormal data. The operations of 800 may collect feedback data based on the one or more data sampling strategies.

The operations of 800 may provide one or more t-shirt size options, data storage options, and the one or more data sampling strategies for suggesting one or more enhanced training data allocations. The operations of 800 may provide a projected learning curve for the machine learning operations and benefit tradeoffs for each of the one or more enhanced training data allocations. The operations of 800 may predict a degree of impact on the dataset for each of the one or more enhanced training data allocations based on a training accuracy, training time, the dataset, computing hardware configurations, and the one or more data sampling strategies.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving machine learning operations within a cloud computing environment when training a machine learning model for execution within the cloud computing environment, the method comprising:

determining one or more training data sampling strategies based on a dataset hosted using a cloud computing service in a cloud computing environment;

predicting a cost in resource utilization of each of the one or more training data sampling strategies in terms of a cost of data storage in a cloud object and in terms of a cost of training a machine learning model in the cloud computing environment to consume data provided by each of the one or more data sampling strategies;

predicting a degree of impact to accuracy of the one or more training data sampling strategies;

suggesting as part of a data pre-processing step of an automated machine learning model prediction service one or more enhanced training data allocations for machine learning operations in a cloud computing environment based on the one or more data sampling strategies, the one or more enhanced training data allocations each having one or more portions of data removed from the cloud computing environment to minimize cost of training the machine learning model while adhering to constraints of accuracy and run time; and training the machine learning model utilizing the suggested enhanced training data allocations from the dataset, the machine learning model trained with the one or more portions of data removed from the dataset prior to training of the machine learning model to minimize the cost of training the machine learning model while adhering to the constraints of accuracy and run time.

2. The method of claim 1, further including receiving, as the dataset, a plurality of data types and data features, wherein the plurality of data types includes at least tabular data and timeseries data and the data features include at least a change point, seasonality data, and clustered data.

3. The method of claim 1, further including:

applying a forward allocation as a data sampling strategy for tabular data;

applying a backward allocation as a data sampling strategy for time series data;

applying a stratified sampling as a data sampling strategy for clustered data;

applying constraint sampling to include a defined time period as a data sampling strategy for seasonal data; and using a change point detection as a data sampling strategy for abnormal data.

4. The method of claim 1, further including collecting feedback data based on the one or more data sampling strategies.

5. The method of claim 1, further including providing one or more t-shirt size options, data storage options, and the one or more data sampling strategies for suggesting one or more enhanced training data allocations.

6. The method of claim 1, further including providing a projected learning curve for the machine learning operations and benefit tradeoffs for each of the one or more enhanced training data allocations.

7. The method of claim 1, further including predicting a degree of impact on the dataset for each of the one or more enhanced training data allocations based on a training accuracy, training time, the dataset, computing hardware configurations, and the one or more data sampling strategies.

8. A system for improving machine learning operations within a cloud computing environment when training a machine learning model for execution within the cloud computing environment, the system comprising:

one or more computers with executable instructions that when executed cause the system to:

determine one or more training data sampling strategies based on a dataset hosted using a cloud computing service in a cloud computing environment;

predicting a cost in resource utilization of each of the one or more training data sampling strategies in terms of a cost of data storage in a cloud object and in terms of a cost of training a machine learning model in the cloud computing environment to consume data provided by each of the one or more data sampling strategies;

predicting a degree of impact to accuracy of the one or more training data sampling strategies;

suggest as part of a data pre-processing step of an automated machine learning model prediction service one or more enhanced training data allocations for machine learning operations in a cloud computing environment based on the one or more data sampling strategies, the one or more enhanced training data allocations each having one or more portions of data removed from the cloud computing environment to minimize cost of training the machine learning model while adhering to constraints of accuracy and run time; and training the machine learning model utilizing the suggested enhanced training data allocations from the dataset, the machine learning model trained with the one or more portions of data removed from the dataset prior to training of the machine learning model to minimize the cost of training the machine learning model while adhering to constraints of accuracy and run time.

9. The system of claim 8, wherein the executable instructions when executed cause the system to receive, as the dataset, a plurality of data types and data features, wherein the plurality of data types includes at least tabular data and timeseries data and the data features include at least a change point, seasonality data, and clustered data.

10. The system of claim 8, wherein the executable instructions when executed cause the system to:

apply a forward allocation as a data sampling strategy for tabular data;

apply a backward allocation as a data sampling strategy for time series data;

apply a stratified sampling as a data sampling strategy for clustered data;

apply constraint sampling to include a defined time period as a data sampling strategy for seasonal data; and use a change point detection as a data sampling strategy for abnormal data.

11. The system of claim 8, wherein the executable instructions when executed cause the system to collect feedback data based on the one or more data sampling strategies.

12. The system of claim 8, wherein the executable instructions when executed cause the system to provide one or more t-shirt size options, data storage options, and the one or more data sampling strategies for suggesting one or more enhanced training data allocations.

13. The system of claim 8, wherein the executable instructions when executed cause the system to provide a projected learning curve for the machine learning operations and benefit tradeoffs for each of the one or more enhanced training data allocations.

14. The system of claim 8, wherein the executable instructions when executed cause the system to predict a degree of impact on the dataset for each of the one or more enhanced training data allocations based on a training accuracy, training time, the dataset, computing hardware configurations, and the one or more data sampling strategies.

15. A computer program product for improving machine learning operations within a cloud computing environment when training a machine learning model for execution within the cloud computing environment, the computer program product comprising:

one or more computer readable storage media, and program instructions collectively stored on the one or more computer readable storage media, the program instructions comprising:

program instructions to determine one or more training data sampling strategies based on a dataset hosted using a cloud computing service in a cloud computing environment;

program instructions to predict a cost in resource utilization of each of the one or more training data sampling strategies in terms of a cost of data storage in a cloud object and in terms of a cost of training a machine learning model in the cloud computing environment to consume data provided by each of the one or more data sampling strategies;

program instructions to suggest as part of a data pre-processing step of an automated machine learning model prediction service one or more enhanced training data allocations for machine learning operations in a cloud computing environment based on the one or more data sampling strategies, the one or more enhanced training data allocations each having one or more portions of data removed from the cloud computing environment to minimize cost of training the machine learning model while adhering to constraints of accuracy and run time; and program instructions to train the machine learning model utilizing the suggested enhanced training data allocations from the dataset, the machine learning model trained with the one or more portions of data removed from the dataset prior to training of the machine learning model to minimize the cost of training the machine learning model while adhering to the constraints of accuracy and run time.

16. The computer program product of claim 15, further including program instructions to receive, as the dataset, a plurality of data types and data features, wherein the plurality of data types includes at least tabular data and timeseries data and the data features include at least a change point, seasonality data, and clustered data.

17. The computer program product of claim 15, further including program instructions to:

apply a forward allocation as a data sampling strategy for tabular data;

apply a backward allocation as a data sampling strategy for time series data;

apply a stratified sampling as a data sampling strategy for clustered data;

apply constraint sampling to include a defined time period as a data sampling strategy for seasonal data; and use a change point detection as a data sampling strategy for abnormal data.

18. The computer program product of claim 15, further including program instructions to collect feedback data based on the one or more data sampling strategies.

19. The computer program product of claim 15, further including program instructions to:

provide one or more t-shirt size options, data storage options, and the one or more data sampling strategies for suggesting one or more enhanced training data allocations; and provide a projected learning curve for the machine learning operations and benefit tradeoffs for each of the one or more enhanced training data allocations.

20. The computer program product of claim 15, further including program instructions to predict a degree of impact on the dataset for each of the one or more enhanced training data allocations based on a training accuracy, training time, the dataset, computing hardware configurations, and the one or more data sampling strategies.

* * * * *